United States Patent Office 3,178,304
Patented Apr. 13, 1965

3,178,304
METHOD OF TREATING CARBON BLACK
Frank J. Eckert, Morrisville, Pa., and Paul J. Melore, Hamilton Square, N.J., assignors to Columbian Carbon Company, New York, N.Y., a corporation of Delaware
No Drawing. Filed Aug. 30, 1962, Ser. No. 220,538
3 Claims. (Cl. 106—307)

This invention relates to a novel and highly effective method of treating carbon black whereby its physical properties and rubber compounding characteristics are drastically changed. More specifically, the invention relates to improvements in treatment processes of the general type whereby the properties of carbon black are modified by subjecting the black to attrition by hard surfaces, and provides means whereby the treatment is greatly accelerated and rendered more effective and more economical.

It has long been recognized that carbon blacks, and especially furnace blacks, vary greatly as to their particular characteristics and combinations of characteristics. These characteristics depend primarily upon the particular method, operating conditions and the raw material used in the manufacture of the black.

It has also been recognized that the reinforcing properties of carbon black in rubber are associated with three fundamental carbon black properties, specifically, chemical activity, "structure" and surface area. A detailed discussion of these fundamental properties and laboratory tests for evaluating them appear in the papers entitled, "The Carbon Spectrum for the Rubber Compounder" published in Rubber Age, New York, vol. 55, No. 5, for August 1944, beginning on page 469, and vol. 89, No. 2, May 1961, starting on page 269.

Briefly, in reference to these properties, the chemical activity is influenced somewhat by the volatile content of the carbon black and affects the rate of cure of the carbon black-rubber compound. Generally, as the volatile content of the carbon black is increased, the chemical activity of black is increased and the cure rate of the rubber compound is decreased.

The "structure" property may be defined as a linking together of the carbon black particles to form chains or clusters which persist even after the black is incorporated into rubber with severe milling. Although the structure characteristic can be seen in electron microphotographs of carbon black, the use of the E.M. is not practical for everyday control testing and thus the industry usually evaluates structure by the oil absorption characteristics of the carbon black. Generally, when the particle size of the carbon black is held constant, low oil absorption indicates low structure and the tendency of the black to impart low modulus to rubber compounds.

The surface area of a carbon black is a function of its mean particle diameter: the smaller the carbon black particles, the greater the available surface area per pound of material. Surface area may be determined by use of the electron microscope or by low-temperature nitrogen adsorption isotherm commonly known as the B.E.T. method. Generally, the higher the surface area, the greater the rubber reinforcement.

Carbon blacks which have the properties of low structure, high surface area and high chemical activity are becoming increasingly more popular with the rubber compounder, particularly in the compounding of butyl rubber—a rubbery copolymer of a major proportion of an isoolefin and a minor proportion of a multi-olefin, advantageously isobutylene and isoprene.

It is well-known that these fundamental properties of carbon black can be altered by ball milling which, if sufficiently prolonged, will usually increase surface area, increase chemical activity and reduce carbon black structure.

For instance, it has been proposed to drastically ball mill carbon black in the presence of an oxygen-containing gas to produce a black particularly suited for compounding in butyl rubber and halogenated butyl rubber. Such treatment has resulted in a reduction of the structure characteristics of the carbon black, as determined by the oil absorption test, an increase in the B.E.T. surface area and an increase in chemical activity, as indicated by a change in the properties of pH and volatile content. In order to sufficiently modify the properties of the carbon black to obtain optimum results in butyl rubber, the duration of the ball milling should be within the range from about one hour to 50 hours, preferably about 5 to 25 hours.

In copending application of P. J. Melore et al., Ser. No. 185,846, filed April 9, 1962, there is disclosed and claimed an improved process for modifying the properties of carbon black which comprises subjecting dry carbon black to a rapid succession of violent, multidirectional shearing and shattering impacts of hard surface objects, advantageously steel balls having a Rockwell C hardness of not less than about 55, in a vibratory ball mill. This improved process is decidedly more effective than heretofore proposed ball milling procedures, such as rotary ball milling, rolling between tight steel rolls, milling with flint pebbles, etc., and further provides a modified carbon black product having excellent rubber properties in greatly reduced milling time.

However, while the vibratory ball mill process has greatly advanced the art by reducing the milling time to only a fraction of the milling times required by the ball mill procedures of the prior art, and has thus made the use of these modified carbon blacks commercially attractive, it is desirable to still further decrease the milling time, thereby obtaining increased production rates and lower operating costs.

Moreover, heretofore modified carbon blacks resulting from ball milling operations have not been entirely satisfactory in rubbers other than butyl, particularly in styrene-butadiene rubbers (SBR), due mainly to a profound retardation of cure rate. Consequently, it has been necessary to activate the cure by the use of relatively expensive additives such as glycerol.

We have now found that modified carbon blacks having unexpected and highly desirable properties are obtained by subjecting the carbon black to an attritioning action by hard-surface objects in the presence of a minor amount of a compound of a metal selected from the class consisting of the alkali and alkaline earth metals. As a result of this treatment, the volatile content of the carbon black is increased and the structure decreased over that obtained in equivalent treating time by attritioning alone, and the B.E.T. surface area is also greatly increased, though the E.M. surface area is substantially unchanged. Thus the modification of carbon black properties to a desired level may be obtained, in accordance with our improved process, in greatly reduced milling time in relation to the milling times required for previously proposed attritioning methods. Further, the modified carbon black product, unlike previously attritioned blacks, may with advantage be compounded with all types of rubber including butyl, halogenated butyl, natural, styrene-butadiene, chloroprene, acrylonitrile-butadiene rubbers, etc., without retarding the cure rate thereof and consequently without the inconvenience and additional expense of cure activating agents.

The invention has been found especially applicable in the treating of high structure furnace blacks produced from highly aromatic liquid hydrocarbons, such as petroleum residues and tars, although in its broader aspect the invention contemplates treating all types of carbon black including channel black, thermal black and acetylene black.

In carrying out the process of our present invention, the carbon black is subjected to attrition by the hard-surfaced objects in an oxidizing atmosphere, such as air, oxygen or oxygen-enriched air, in the presence of at least 0.05% of an alkali or alkaline earth metal compound, more advantageously from about 0.1 to about 2.5%, by weight of the black.

The alkali and alkaline earth metal compounds which we have found to be most advantageous are salts derived from a weak acid, preferably a weak inorganic acid having an ionization constant (K$i$) at 25° C. of less than about $1 \times 10^{-3}$. Exemplary of these salts are the carbonates, borates, acetates, etc. When a salt of this type is used in an amount of at least 0.1%, by weight of the black being attrited, we have found that the properties of the product carbon black are materially enhanced over those obtained by attritioning alone. Further, the modified carbon black product is characterized by a high volatile content, low structure, high B.E.T. surface area and a pH of at least about 5.0, thereby having a greatly reduced tendency to retard the cure rate of the rubber compound.

A list of ionization constants of acids at 25° C. is found in "Handbook of Chemistry," N. A. Lange, 9th edition, Handbook Publishers, Inc., 1956, beginning on page 1198.

The hard-surface objects used may be of any convenient shape, but are advantageously spherical balls of metal having a Rockwell C hardness of at least 55. The balls may be of a diameter, for instance, as small as $\frac{1}{16}''$, or up to about 1 inch or even up to 2 inches and, if desired, a mixture of balls of various diameters may be used.

Generally, the ratio of balls to charge, that is the ratio, by weight, of the balls to carbon black plus salt in the milling chamber, may, with advantage, vary from about 25:1 to about 350:1, although it has been found preferable to employ a ratio within the range of about 50: to about 175:1.

The attritioning apparatus suitable for use in carrying out the process of the present invention include, but are not limited to, rotary type mills and vibratory mills. In the rotary ball mill, the charge of black and salt is introduced into the milling drum and, as the drum turns, the balls repeatedly roll over each other and trap the material between them thereby attriting it.

When a vibratory ball mill is used, however, the black is subjected to a somewhat different form of action, specifically a rapid succession of violent, multidirectional, shearing and shattering impacts of the balls. Using this type of apparatus, the black and salt are introduced into a milling chamber partially filled with steel balls and the chamber, with the balls and carbon black therein, is subjected to rapid vibratory or oscillatory motion so that the balls are violently agitated and caused to carom off the walls of the mill chamber and strike against each other in a haphazard manner, thus exerting the violent multidirectional, more or less random, shearing, shattering impacts on the black-salt charge.

Vibratory ball mills are well-known articles of commerce and thus need not here be described in detail. While generally any type of vibratory mill may be used, particular advantage has been found in using the type which comprises a ball chamber supported by heavy helical springs, the chamber being violently vibrated by means of eccentric mechanisms positioned at each end thereof, so as to impart a rapid circular motion to the opposite ends of the ball chamber, and to the balls therein, but without causing the chamber to rotate about its axis. The eccentric mechanisms at the respective ends of the chamber may be so timed that one is out of phase with the other. Also, it has been found suitable to use smaller mills of this type equipped with an eccentric mechanism at only one end of the chamber.

As previously noted, one important feature of the present invention is that regardless of the type of ball mill employed, the modification of carbon properties is enhanced over that obtained in equivalent milling time by the ball milling alone. Thus, to achieve a desired level of carbon black properties, it is necessary to ball mill the black for only a fraction of the time previously required.

When a vibratory ball mill is used as the attritioning apparatus, the optimum milling time is dependent upon the character of the carbon black being treated and upon the desired extent of modification, and also upon the character and amount of alkali or alkaline earth metal salt present, at least 0.1% of a salt of a weak acid having an ionization constant of less than $1 \times 10^{-3}$, by weight of the black, being especially advantageous, as previously noted herein. The optimum milling time will also depend upon: ($a$) the frequency and amplitude of vibration of the mill, ($b$) the diameter of the balls, ($c$) the density of the balls, ($d$) the weight of the balls in the mill, ($e$) the weight of carbon black in the mill, relative to the weight of balls, ($f$) the over-all size of the mill chamber and ($g$) the horsepower input to the mill.

The process may also be carried out continuously in the vibratory type mill, in which case the following are also important factors in obtaining optimum operation for a desired level of treatment: ($h$) the feed rate of the black and additive salt, ($i$) the residence time of the black and salt in the mill and ($j$) the hold-up, or weight of black and salt retained in the mill at any given time.

In view of the large number of permissible variables, just noted, it is not possible to prescribe precise operating conditions for accomplishing the desired result. However, the optimum milling time under any particular set of conditions may be readily determined by sampling the attrited black from time to time for testing and continuing the treatment until the desired modification, as evidenced by the test samples, has been obtained.

Generally, the period of vibration of the mill, subject to considerable variation, may range as low as 500 and as high as 5000, but more advantageously should be within the range of from about 800 to 1650 oscillations per minute. Also, the amplitude of vibration or the diameter of the circle about which the end axis of the ball chamber is moved by eccentric mechanism, may be varied over a considerable range. Generally, amplitudes within the range from ⅛ inch to about ¾ inch are preferred, although amplitudes even lower than ⅛ inch may be used.

When the carbon black is attrited in the presence of an alkali or alkaline earth metal salt in a rotary-type ball mill, the optimum milling time is dependent upon the following factors: ($a$) the weight of the balls, ($b$) the size of the mill, ($c$) the diameter of the mill, ($d$) the weight ratio of balls to black, ($e$) the speed of rotation of the mill. Also, as previously noted, the character and amount of salt influence the milling time.

As in the case of the vibratory ball mill apparatus, it is not possible to precisely set forth operating conditions for achieving the desired result and, therefore, it is advantageous to test samples of the material being treated from time to time until the necessary modification has been obtained.

The temperature of the attrition may range from about 65° F. to about 700° F., although preferably should not exceed about 450° F. If it is desired to attrite the black at elevated temperatures, in excess of those generated by the attrition, the body of the attritioning apparatus may be wound with a heating element or provided with other suitable heating means.

In lieu of the above-mentioned types of apparatus, the step of attriting carbon black in the presence of an alkali or alkaline earth metal salt may be accomplished in apparatus such as a hammer mill or a rod mill which is structurally quite similar to a ball mill except that hardened steel rods are used instead of balls.

In any of these types of attritioning apparatus, the additive salt may be premixed with the carbon black prior to feeding to the mill or the additive salt and carbon black may be separately fed to the mill in the predetermined proportions. Also, in lieu of a single additive salt, a mixture of two or more of the salts may be used, so long as they are not incompatible. Further, in selecting the additive salt or salts, care should be exercised to avoid the use of salts which might lead to violent combustion of the carbon black under the attritioning conditions.

It is also possible to obtain considerable modification of carbon black properties by attriting the carbon black using apparatus of the type described in the Heller U.S. Patent 2,890,839. The modification in properties is advantageously accomplished with this type of apparatus, in accordance with our present invention, by subjecting a mixture of the black and the salt to extremely high pressure detrition resulting from passing the mixture as a continuous uniform stream between the peripheral surfaces of hard, non-yielding counterrotating rolls spaced apart a distance not exceeding 0.030 inch and rotating at a maximum peripheral speed not exceeding 150 ft./min., the peripheral speed of one roll exceeding that of the other by about 25%. It is particularly advantageous to predense the mixture of black and salt to a bulk density of at least 15 pounds per cubic foot, more advantageously between 16–24 lbs./ft.$^3$, prior to feeding the mixture to the bite between the roll.

While we are not able to state with certainty the reasons for the unexpected result obtained when the carbon black is attrited in the presence of an alkali or alkaline earth metal salt, particularly those salts of weak acids, it is our present conviction that the influence of the salts is in part, at least, catalytic in nature, mainly in view of the increase in the volatile content of the carbon black over that realized when the carbon black is attrited without the additive. The presence of an alkali or alkaline earth metal salt also apparently aids in reducing the structure of the carbon black, but in some instances increases the B.E.T. surface area of the black over that expected in comparable milling times in conventional attritioning operations, though the particle size of the black, as indicated by the electron microscope, remains unchanged.

The invention, and effectiveness thereof in altering the physical and chemical properties and rubber compounding characteristics of carbon black will be illustrated by the following specific examples, but the examples should not be construed as limitative.

EXAMPLE I

In this operation, a furnace carbon black of the HAF (high abrasion furnace) type was subjected to ball milling in a vibratory-type ball mill at a temperature of 270° F. in the presence of varying amounts of potassium carbonate, as shown in the following tabulation, employing ⅝″ steel balls and a ball to change ratio of 50:1.

The chemical and physical properties of the black prior to and following treatment are set forth in Table 1, as are also the properties of the black ball milled under the same conditions, but without the potassium carbonate.

Table 1

| | Control | Ball milled, no $K_2CO_3$ | Ball milled with 1% $K_2CO_3$ | Ball milled with 2% $K_2CO_3$ |
|---|---|---|---|---|
| B.E.T. surface area (m.$^2$/g.) | 75 | 125 | 124 | 124 |
| Oil absorption (gals./100 lbs.) | 14.0 | 9.6 | 9.0 | 8.9 |
| Percent volatile | 1.6 | 2.8 | 3.2 | 4.0 |
| pH | 8.0 | 4.0 | 9.4 | 9.9 |

As shown by the above results, the blacks attrited in the presence of potassium carbonate had higher volatile contents, lower oil absorption values and higher pH values than did the black ball milled without $K_2CO_3$, and greatly modified properties in comparison to those of the untreated control.

EXAMPLE II

In this operation, the HAF black, referred to in the above Table 1 as "control," was attrited for 17 hours in a rotary type ball mill at room temperature in the presence of 2% potassium carbonate, by weight of the black, employing steel balls of ⅝ inch diameter and a ball to charge ratio of 32:1.

The chemical and physical properties of the ball milled blacks (i.e., without $K_2CO_3$ and with $K_2CO_3$) as well as the rubber compounding properties and recipe in natural rubber are set forth in Table 2:

Table 2

| | Ball milled, no $K_2CO_3$ | Ball milled with $K_2C_3$ |
|---|---|---|
| Carbon black properties: | | |
| B.E.T. surface area (m.$^2$/g.) | 115 | 120 |
| Oil absorption (gal./100 lbs.) | 7.9 | 6.9 |
| Percent Volatile | 3.9 | 4.8 |
| pH | 3.3 | 9.1 |
| Rubber properties cured at 280° F.: | | |
| Cure time | 60 | 24 |
| 20′ L-300 (lbs./in.$^2$) | 320 | 475 |
| 20′ tensile (lbs./in.$^2$) | 1,800 | 2,450 |
| 60′ L-300 | 860 | 770 |
| 60′ tensile | 2,825 | 2,580 |
| 90′ L-300 | 1,020 | 820 |
| 90′ tensile | 2,920 | 2,450 |
| 90′ elongation (percent) | 545 | 535 |
| 90′ Shore hardness | 57 | 56 |
| Log R | 9.5 | 10.0 |
| Maximum tensile | 2,920 | 2,625 |
| Rebound | 73.8 | 72.6 |
| Aged stress-strain properties (aged 1 week at 176° F.): | | |
| 60′ L-300 | 1,720 | 1,320 |
| 60′ tensile | 1,870 | 1,920 |
| 60′ elongation | 425 | 390 |
| 60′ Shore hardness | 53 | 57 |
| 60′ percent tensile retained | 66 | 74 |

| | Parts by weight |
|---|---|
| Compounding recipe: | |
| Smoked sheets | 100 |
| Carbon black | 50 |
| Zinc oxide | 5 |
| Pine tar | 3 |
| Stearic acid | 3 |
| Agerite Hipar* (antioxidant) | 1 |
| Sulfur | 2.8 |
| Captax* accelerator | 0.5 |

*The composition, chemical name, function and manufacturers are given in the 1961 Rubber Red Book, page 481, published by Rubber Age, New York.

As shown by the above data, the carbon black ball milled in accordance with the present invention had a lower oil absorption, higher B.E.T. surface area, higher pH and higher percent volatile content in comparison with the conventionally ball milled black. Further, while the compounding characteristics of the two blacks were roughly equivalent, the composition formulated with the carbon black ball milled in the presence of potassium carbonate cured much faster than did the conventionally ball milled black and generally had better aging properties, particularly in regard to percent tensile strength retained.

EXAMPLE III

In this operation, an HAF black was attrited for two hours in a vibratory type ball mill at room temperature in the presence of 1% of $K_2CO_3$, by weight of the black, employing ⅝ inch balls and a ball to charge ratio of 50:1. The chemical and physical properties of the black prior to and after treatment, and also the rubber compounding recipe and characteristics, in butyl rubber are set forth in Table 3, below:

*Table 3*

|  | Untreated | Ball Milled with 1% $K_2CO_3$ |
|---|---|---|
| Carbon Black Properties: |  |  |
|   B.E.T. surface area ($m.^2/g$) | 76 | 127 |
|   Oil absorption (gal./100 lbs.) | 12.7 | 7.9 |
|   Percent volatile | 1.5 | 3.7 |
|   pH | 8.0 | 9.5 |
| Rubber properties (cured at 290° F.), 60' properties: |  |  |
|   L-300 (lbs./in.$^2$) | 1,100 | 850 |
|   Tensile (lbs./in.$^2$) | 2,280 | 3,050 |
|   Elongation (percent) | 555 | 605 |
|   Shore hardness | 66 | 55 |
| Dynamic properties: |  |  |
|   $\eta f \times 10^{-6}$, poises$\times$cps | 7.1 | 3.0 |
|   Percent Resilience | 44.3 | 57.4 |

|  | Parts by weight |
|---|---|
| Recipe: |  |
|   Butyl rubber | 100 |
|   Carbon black | 50 |
|   Zinc oxide | 5 |
|   Stearic acid | 1 |
|   Benzothiazyl disulfide accelerator | 1 |
|   Tetramethylthiuram disulfide accelerator | 1 |
|   Sulfur | 2 |

As can readily be seen from the above results, the black modified in accordance with the present invention displayed superior compounding characteristics in butyl rubber.

We claim:
1. In the process for modifying the properties of high structure furnace carbon black by subjecting the black to attritioning action of hard-surfaced objects in an oxidizing atmosphere in an attritioning mill, the improvement comprising adding to the mill from about 0.1% to about 2.5%, by weight of the black, of a salt selected from the group consisting of alkali and alkaline earth metal borates, acetates and carbonates.
2. The process of claim 1 in which the metal salt is potassium carbonate.
3. The process of claim 1 in which said salt is a salt of an alkali metal.

References Cited by the Examiner
UNITED STATES PATENTS

| | | | |
|---|---|---|---|
| 3,010,794 | 11/61 | Friauf et al. | 106—307 |
| 3,010,795 | 11/61 | Friauf et al. | 106—307 |
| 3,054,662 | 9/62 | Gessler | 23—209.1 |

TOBIAS E. LEVOW, *Primary Examiner.*

UNITED STATES PATENT OFFICE
CERTIFICATE OF CORRECTION

Patent No. 3,178,304    April 13, 1965

Frank J. Eckert et al.

It is hereby certified that error appears in the above numbered patent requiring correction and that the said Letters Patent should read as corrected below.

Column 3, line 42, for "50:" read -- 50:1 --; column 6, Table 2, heading to the second column, for "Ball milled with $K_2C_3$" read -- Ball milled with $K_2CO_3$ --.

Signed and sealed this 5th day of October 1965.

(SEAL)
Attest:

ERNEST W. SWIDER
Attesting Officer

EDWARD J. BRENNER
Commissioner of Patents